F. G. & E. A. Floyd,
Cherry Stoner.
N° 61,331. Patented Jan. 22, 1867.
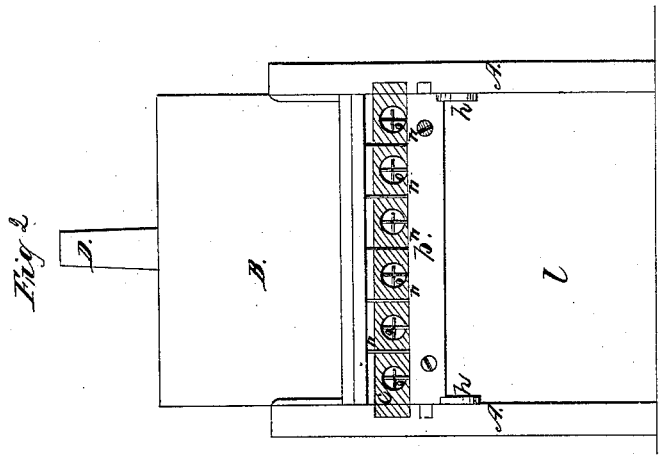
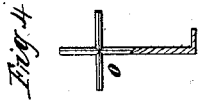
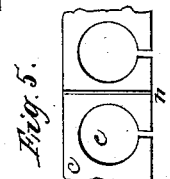
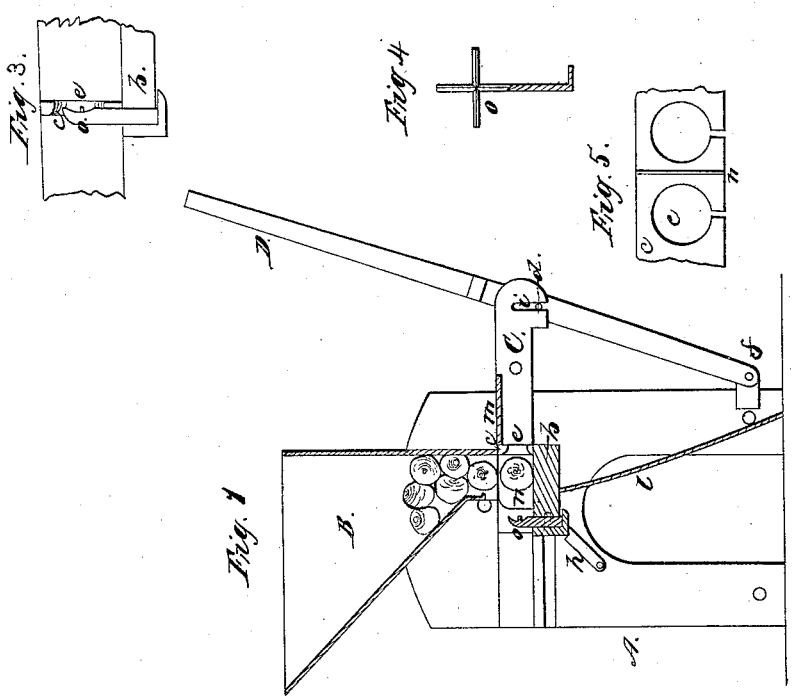
Witnesses:
P. T. Dodge
C. H. Keller
Inventor:
F. G. Floyd &
E. A. Floyd
By W. C. Dodge
attorney.

United States Patent Office.

F. G. AND E. A. FLOYD, OF MACOMB, ILLINOIS.

Letters Patent No. 61,331, dated January 22, 1867.

---

IMPROVED CHERRY STONER.

---

*The Schedule referred to in these Letters Patent and making part of the same.*

---

TO ALL WHOM IT MAY CONCERN:

Be it known that we, F. G. and E. A. FLOYD, of Macomb, in the county of McDonough, and State of Illinois, have invented a new and improved Cherry Stoner; and we do hereby declare that the following is a clear, full, and exact description thereof, reference being had to the accompanying drawings, making part of this specification, and to the letters of reference marked thereon, like letters indicating like parts wherever they occur. To enable others to construct and use our improved machine, we will proceed to describe it.

Figure 1 is a transverse vertical section.

Figure 2 is a front elevation; and

Figures 3, 4, and 5 are views of portions shown detached.

A represents the frame of the machine, which may be of any suitable size. Upon this frame is mounted a hopper, B, extending the entire length of the machine, and having a throat or opening at the bottom of proper width to permit but a single row of the cherries to pass through at a time, as represented in fig. 1. Underneath the hopper B is placed a bed-piece, $b$. This latter is so located as to leave an opening equal to the diameter of a cherry between it and the bottom of the hopper, into which opening is fitted a sliding-bar, $c$. Attached to the front side of this bar $c$, and projecting at right angles therefrom, is a series of division plates, $n$, constituting a series of cells, each of such a size as to receive a single cherry. To the rear side of the bar $c$, an arm, C, is attached, which projects backward, and is connected by a pin, $d$, to a lever, D, pivoted at $f$ to the frame A, as shown in fig. 1, by which means a reciprocating movement is imparted to the sliding-bar $c$. Through this bar $c$ a series of holes, $e$, is made, corresponding in number with the cells formed by the plates $n$, and occupying a position centrally between said plates, as shown in figs. 2 and 5. These holes $e$ are of such size as to permit the cherry stone to pass through, while not permitting the passage of the whole cherries. To the front of the bed-piece $b$ is secured a series of knives, $o$, the form of which is shown in fig. 4. These knives are so located as to stand directly opposite the holes $e$ in the bar $c$, as shown in figs. 2 and 3, there being a slit cut in the bar $c$ at the bottom of each hole $e$, as shown in fig. 5, through which the body or vertical stem of the knife $o$ passes when the bar $c$ is shoved forward, as represented in fig. 3. It will be observed that by this arrangement the cross-arms of the knife $o$ are made to enter the holes $e$, as represented in figs. 2 and 3, when the bar $c$ is shoved forward. Immediately in rear of the bar $c$, and resting on the arms C, is a plate, $m$, of sufficient width to cover the mouth of the hopper when shoved under it. A plate, $l$, extends from the under side of the bed-piece $b$ to the bottom of the frame, as shown in fig. 1, dividing the front from the rear.

The operation is as follows: The cherries are placed in the hopper B, and the lever D being thrown back, a cherry will fall from the hopper into each cell underneath, and rest on the bed-piece $b$. Now, by shoving the lever D forward the bar $c$ is moved with it, carrying the cherries in the cells forward against the knives $o$, which coming in contact therewith, cut the fruit, and striking against the stone, force it through the hole $e$, when it drops on to the bed-piece $b$ in rear of bar $c$, the fruit being shoved past the knife, and dropping down at the front side of plate $l$. While the bar $c$ is thus shoved forward, the plate $m$ closes the mouth of the hopper, and prevents the cherries from dropping down in rear of the bar $c$. As the bar $c$ is drawn back, it sweeps the stones off the bed-piece $b$, and they fall down on the rear side of the plate $l$, the cells being again filled with cherries from the hopper by the same operation. Any desired number of cells and knives may be used, and thus the work be executed with great rapidity.

Having thus described our invention, what we claim, is—

1. The knife or stone retainer $o$, when constructed in the manner shown, and supported on the single arm, to permit it to operate in connection with the reciprocating bar $c$, substantially as herein set forth.

2. The reciprocating bar $c$, having the plates $n$ attached, and provided with the holes $e$, when used in combination with the knives $o$, substantially as shown and described.

3. The hopper B, reciprocating bar $c$, knives $o$, and bed-piece $b$, all arranged and operating as described.

F. G. FLOYD,
E. A. FLOYD.

Witnesses:
J. H. WILSON,
W. O. BLAISDELL.